(12) United States Patent
Chen et al.

(10) Patent No.: US 6,404,460 B1
(45) Date of Patent: Jun. 11, 2002

(54) EDGE ENHANCEMENT WITH BACKGROUND NOISE REDUCTION IN VIDEO IMAGE PROCESSING

(75) Inventors: Datong Chen, Fremont; Xinping He, San Jose, both of CA (US)

(73) Assignee: Omnivision Technologies, Inc., Sunnyvale, CA (US)

( * ) Notice: Subject to any disclaimer, the term of this patent is extended or adjusted under 35 U.S.C. 154(b) by 0 days.

(21) Appl. No.: 09/252,841

(22) Filed: Feb. 19, 1999

(51) Int. Cl.$^7$ .............................................. H04N 5/208
(52) U.S. Cl. ....................................... 348/606; 348/627
(58) Field of Search .......................... 358/162; 348/606, 348/625, 627, 629; H04N 5/208

(56) References Cited

U.S. PATENT DOCUMENTS 6,148,116 A * 11/2000 Park et al. ................... 348/606

FOREIGN PATENT DOCUMENTS

JP 4-176266 * 6/1992 .......... H04N/5/208

OTHER PUBLICATIONS

Benson, K. Blair and Whitaker, Jerry C., "Broadcast Production Equipment, Systems, and Services—Color Cameras" and "Receivers—Video and Chroma Processing," *Televison Engineering Handbook* Featuring HDTV Systems, Revised Edition, McGraw–Hill, 1992, pp. 14.92–14.93 and 13.154–13.157.

Onga, Makota et al., "New Signal–Processing LSIs for the 8mm Camcorder," *IEEE Transactions on Consumer Electronics*, vol. 36, No. 3, Aug. 1990, pp. 494–502.

Yoshimochi, Shigeru et al, "A New Single Chip LSI for an NTSC CTV Signal Processing," *IEEE Transactions on Consumer Electronics*; vol. 35, No. 3, Aug. 1989, pp. 297–307.

* cited by examiner

*Primary Examiner*—David E. Harvey
(74) *Attorney, Agent, or Firm*—Perkins Coie LLP

(57) ABSTRACT

The present invention is directed to a method and apparatus for image edge enhancement with background noise reduction. According to the method and apparatus, background noise is reduced through use of feed forward gain control and threshold control of a sharpness control amplifier. In a prior art circuit, the sharpness control amplifier was controlled only by a sharpness control signal. By controlling the sharpness control amplifier also with a feed forward gain control and a threshold control, the circuit can be made to have background noise reduction while maintaining a continuous input/output characteristic curve. According to the input/output characteristic curve, when the amplitude of the transitions of the video signal are below a particular threshold value, the amplification of the sharpness control amplifier is reduced by the gain control, such that low amplitude noise signals are reduced. When the amplitude of the transitions of the video signal, representing image edge transitions, are above the amplitude of the threshold level, then normal signal amplification is produced. In this manner, the edges of the image are enhanced while background noise is reduced.

15 Claims, 6 Drawing Sheets

(a) (b) (c) (d) (e) (f) (g)

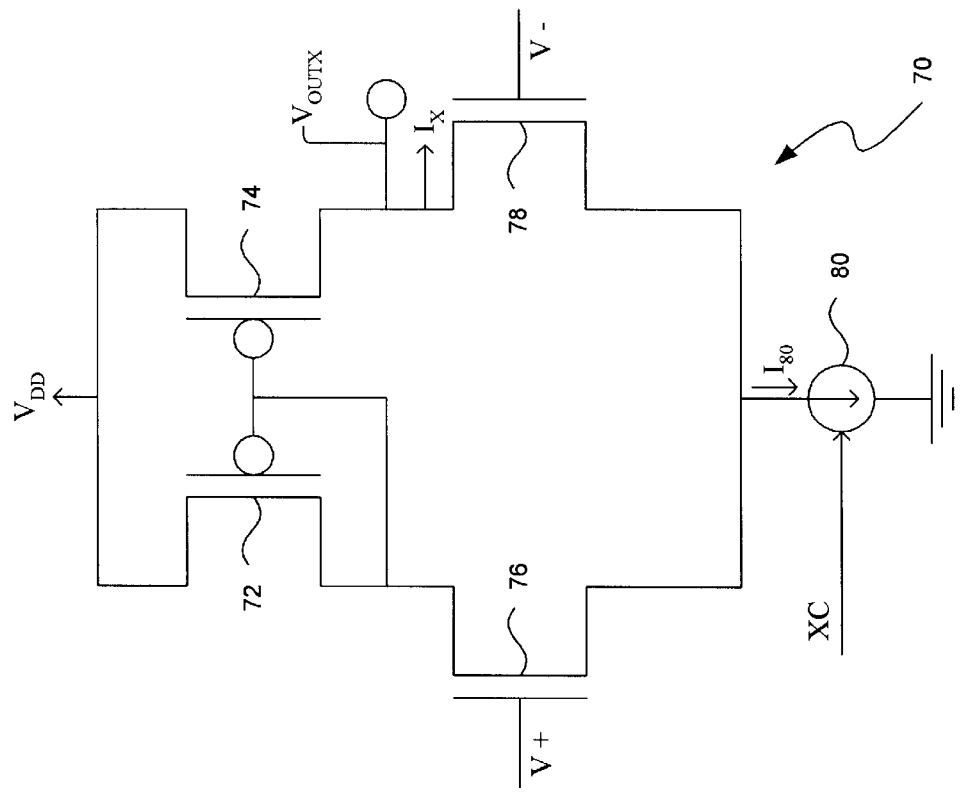
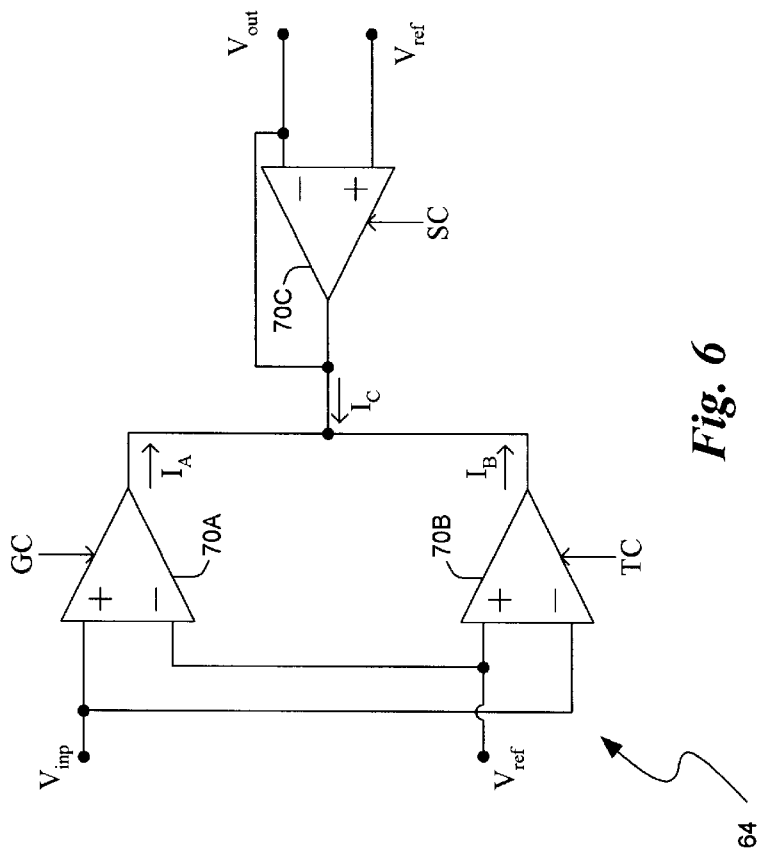
Fig. 7
Fig. 6

EDGE ENHANCEMENT WITH BACKGROUND NOISE REDUCTION IN VIDEO IMAGE PROCESSING

FIELD OF THE INVENTION

The present invention relates to signal processing for imaging arrays and, more particularly, to image edge enhancement with background noise reduction in a CMOS image sensor.

BACKGROUND OF THE INVENTION

Integrated circuit technology has revolutionized various fields including computers, control systems, telecommunications, and imaging. In the field of imaging, the charge couple device (CCD) sensor has made possible the manufacture of relatively low-cost and small hand-held video cameras. An alternative low-cost technology to CCD integrated circuits is the metal oxide semiconductor (MOS) integrated circuit. Using MOS technology, the signal processing circuitry can be integrated alongside the imaging circuitry, thus allowing for a single integrated chip to form a complete stand-alone imaging device. To reduce the costs of imaging systems, there has been increasing pressure to reduce the number of chips and other components while still maintaining high image quality.

An example of a single chip used for CTV image processing is detailed in "A New Single Chip LSI for an NTSC CTV Signal Processing," by Yoshimochi et al., *IEEE, Transactions on Consumer Electronics,* Volume 35, August 1989, p. 297. As described for the Yoshimochi et al. device, the video signal processing stage shown in FIG. 1 of that reference consists of an input clamp circuit (CLAMP), a black level stretcher (BLACK DET), a DC restoration circuit (DC RESTORATION), a switchable 3.58 MHz chroma trap (3.58 TRAP), a video delay line circuit to compensate the chroma signal delay time (DELAY LINE), a delay line type picture sharpness control (DL CONTOUR), a contrast control circuit (CONTRAST), and a brightness control circuit (CLAMP BRIGHT).

The delay line type picture sharpness control circuit (DL CONTOUR) of the Yoshimochi et al. device is shown in FIG. 4 of that reference, which has been reproduced as FIG. 1 herein. As illustrated in FIG. 1, the video input is received at a line A, which is coupled to the input of a delay line 10, and is also coupled to the inverting input of an amplifier 14. The output of delay line 10 is coupled to a line B, which is coupled to the input of a delay line 12, is coupled to the non-inverting inputs of amplifiers 14 and 16, and is coupled to a summer 26. The output of delay line 12 is coupled to a line C, that is coupled to the inverting input of the amplifier 16. The output of the amplifier 14 is coupled to a line D that is coupled through a limiter 18 to a summer 22. The output of the amplifier 16 is coupled to a line E that is coupled through a limiter 20 to a summer 22. The output of summer 22 is coupled to the input of a sharpness control circuit 24. The output of sharpness control circuit 24 is coupled to a line F that is coupled to summer 26. The output of summer 26 is coupled to a line G, which provides the video output of the system. The Yoshimochi et al. reference states that this delay line type picture sharpness control circuit achieves a ringingless horizontal contour enhancement when compared with a conventional second order differential type.

The operation of the circuit of FIG. 1 is illustrated in the timing diagrams of FIGS. 2A–2G. FIGS. 2A, 2B, and 2C show the signals on the lines A, B, and C, respectively. As illustrated above, the signal on line B is produced by delaying the signal on line A for approximately one time period (t=approximately 160 ns) through the delay line 10. Then the signal on line C is produced by delaying the signal on line B for approximately one more time period through the delay line 12.

FIG. 2D illustrates the output D of amplifier 14 that subtracts the signal shown in FIG. 2A from the signal shown in FIG. 2B. FIG. 2E illustrates the output E of amplifier 16, which subtracts the signal shown in FIG. 2C from the signal shown in FIG. 2B. FIG. 2F shows the sum of the outputs D and E from the limiters 18 and 20, once they have been added through the summer 22, and then adjusted by the sharpness control 24 to become the signal F. FIG. 2G shows the output G of summer 26, which adds the signals shown in FIGS. 2B and 2F.

The overall purpose of the circuit of FIG. 1 and its operations illustrated in FIG. 2 can be described with reference to the timing diagrams of FIG. 3. In general, the purpose of the circuit of FIG. 1 is to enhance the transitions in the video signal that occur at the edge of an image. At the edge of an image, the signals produced by the pixels of the sensor array may have a sharp contrast from one pixel to the next, as the image is scanned out. In other words, at the edge of an image, one pixel may be receiving a signal at a low dark level, while the next pixel is receiving a signal at a high light level. FIG. 3A illustrates a transition at time $t_1$, representing a transition from a pixel receiving a low dark signal to a pixel receiving a high light signal. The signal shown in FIG. 3A is for an ideal case where the image processing circuitry reacts instantaneously. However, in actual signal processing circuitry, the various components may contribute to a loss in resolution at higher spatial frequency, such that the transition that is begun at time $t_1$, may not be completed until time $t_2$. A timing diagram illustrating this effect is shown in FIG. 3B. To compensate for this phenomena, one method is to enhance the edge of the image by adding an extra signal at the transitions to attempt to make the processed signal appear more like the signal shown in FIG. 3A. The signal that results from enhancing the edge of the signal is illustrated in FIG. 3C. It can be seen that the signal illustrated in FIG. 3C is comparable to the first half of the signal illustrated in FIG. 2G. Thus, the type of transition enhancement shown in FIG. 3C is what the circuit of FIG. 1 is attempting to produce.

One of the disadvantages of the circuit of FIG. 1 is that, in addition to producing symmetrical overshoots around transitions in the picture, it also amplifies the noise simultaneously. In other words, the same process that enhances the edges for desired signal transitions also enhances undesirable noise transitions.

The present invention is directed to a method and apparatus that overcomes the foregoing and other problems in the prior art. More specifically, the present invention is directed to a method and apparatus for image edge enhancement with background noise reduction.

SUMMARY OF THE INVENTION

A method and apparatus for image edge enhancement with background noise reduction is disclosed. According to the method and apparatus, background noise is reduced through use of feed forward gain control and threshold control of a sharpness control amplifier. In a prior art circuit, the sharpness control amplifier was controlled only by a sharpness control signal. By controlling the sharpness control amplifier also with a feed forward gain control and a threshold control, the circuit can be made to have background noise reduction while maintaining a continuous input/output characteristic curve. According to the input/output characteristic curve, when the amplitude of the transitions of the video signal are below a particular threshold value, the amplification of the sharpness control amplifier is reduced by the gain control, such that low amplitude noise signals are reduced. When the amplitude of the transitions of the video signal, representing image edge transitions, are above the amplitude of the threshold level, then normal signal amplification is produced.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 6 is a schematic diagram of a sharpness control amplifier of FIG. 4;

FIG. 7 is a schematic diagram of a transconductance amplifier of FIG. 6; and

DETAILED DESCRIPTION OF THE PREFERRED EMBODIMENT

Figure 4:
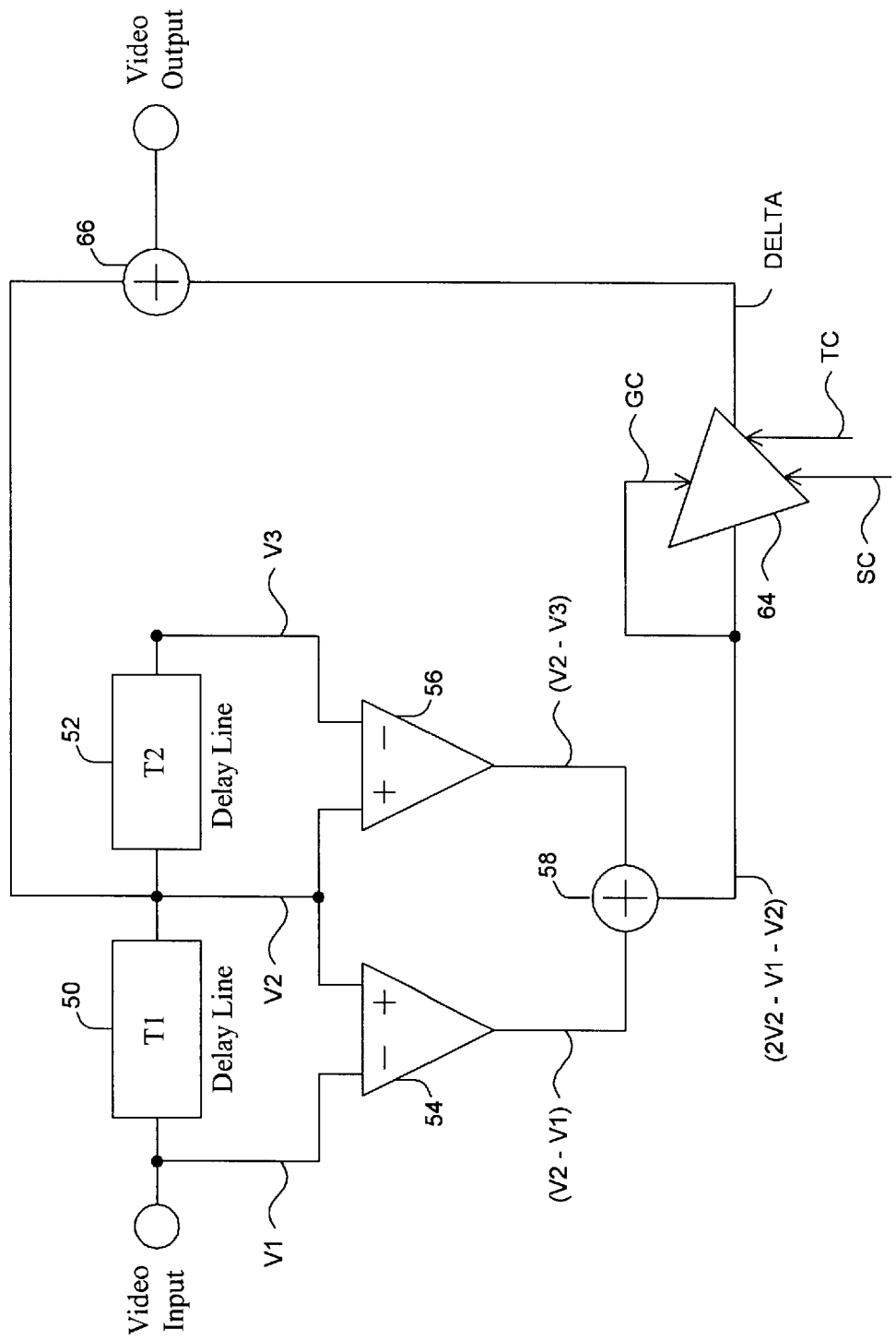
FIG. 4 is a schematic diagram of an edge enhancement circuit with background noise reduction formed in accordance with the present invention.

With reference to FIG. 4, a schematic diagram of an edge enhancement circuit with background noise reduction formed in accordance with the present invention is shown. The circuit of FIG. 4 is somewhat similar to the prior art circuit of FIG. 1. As illustrated in FIG. 4, the video input of the circuit is designated as a signal V1 and is coupled to an input of a delay line 50, and is also coupled to an inverting input of an amplifier 54. The output of delay line 50 is designated as a signal V2 and is coupled to an input of a delay line 52, and is also coupled to the non-inverting inputs of amplifiers 54 and 56, and is also coupled to an input of a summer 66. The output of delay line 52 is designated as a signal V3 and is coupled to the inverting input of amplifier 56. The outputs of amplifiers 54 and 56 are summed through a summer 58. The output of the summer 58 is coupled to the signal input of a sharpness control amplifier 64. The signal input of the sharpness control amplifier 64 is coupled through a feed forward gain control loop as a gain control signal GC for the sharpness control amplifier 64. Sharpness control amplifier 64 also receives a sharpness control signal SC and a threshold control signal TC. The output of sharpness control amplifier 64 is designated as a signal $V_{out}$ and is coupled to an input of summer 66. The output of summer 66 is the video output of the circuit.

Figure 2:
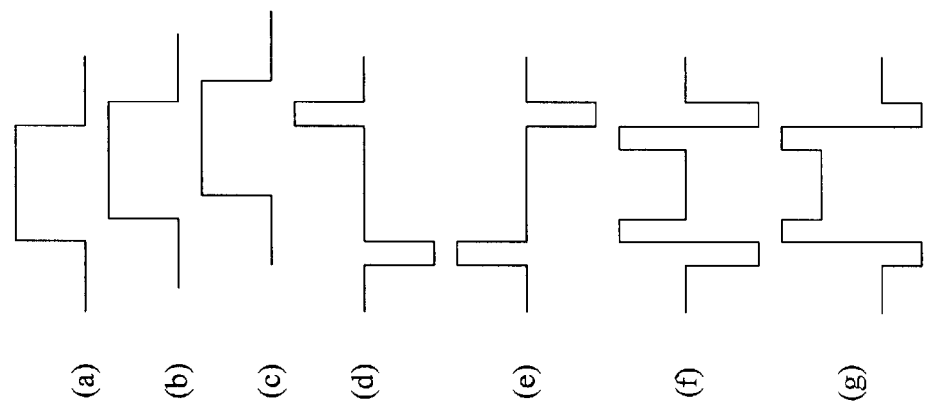
FIGS. 2A–2G are a set of timing diagrams illustrating the operation of the prior art circuit of FIG. 1.
Figure 1:
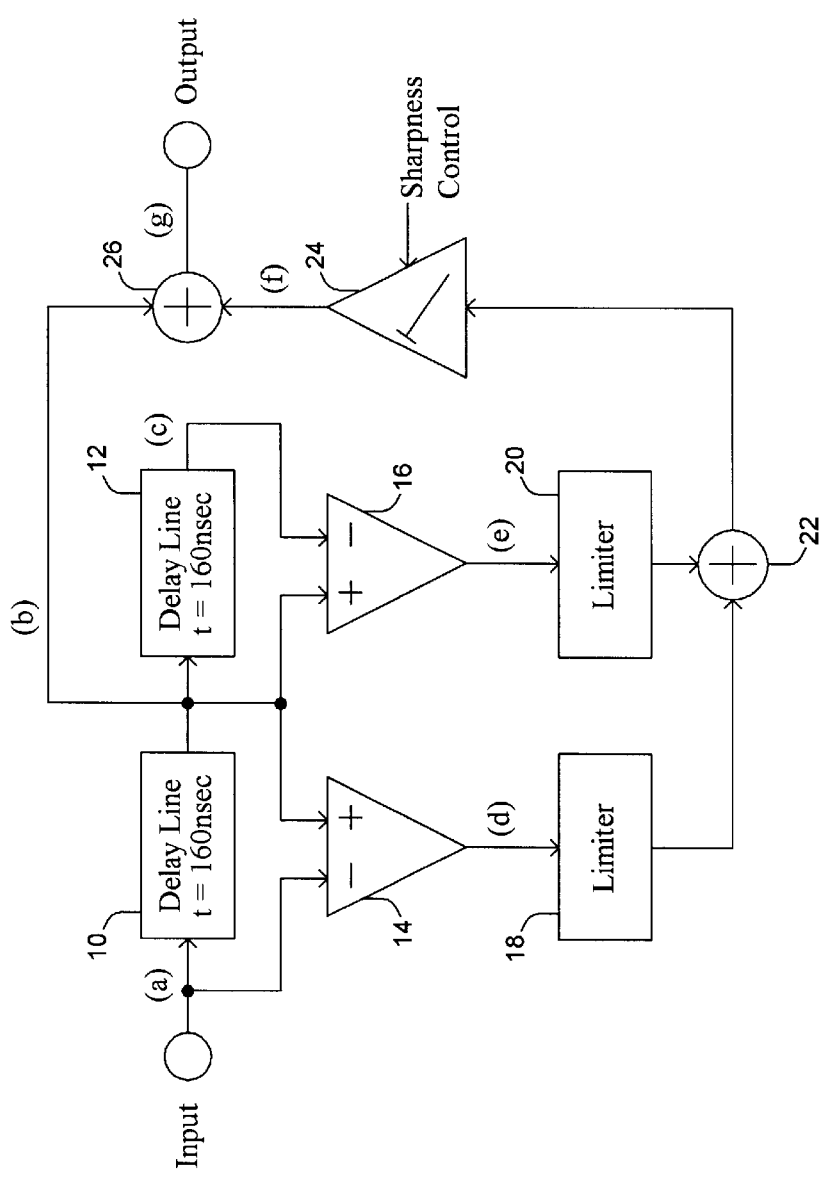
FIG. 1 is a schematic diagram of a prior art edge enhancement circuit.
Figure 3:
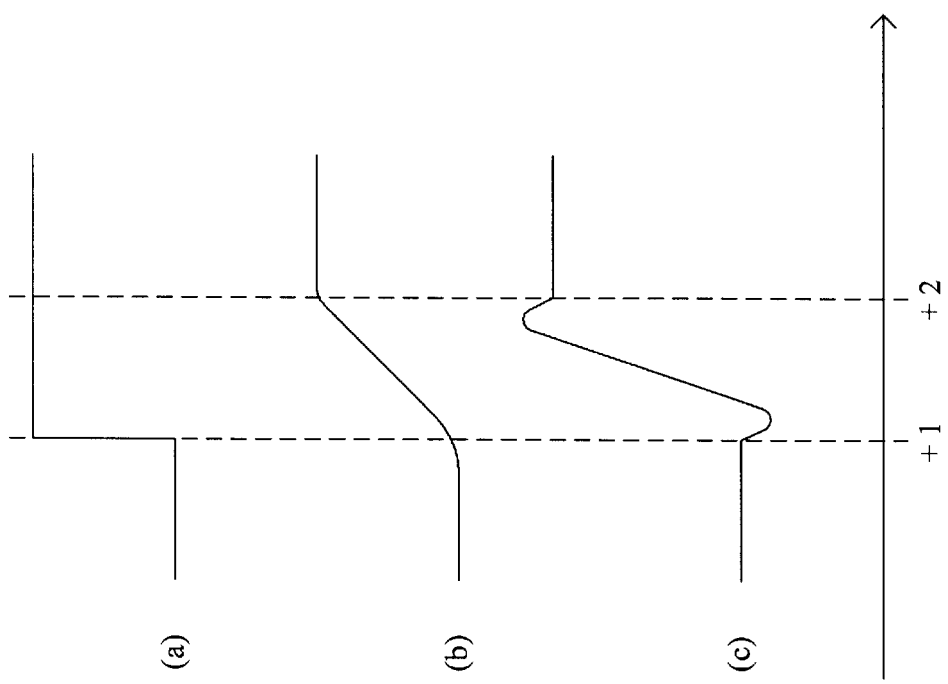
FIGS. 3A–3C are a set of timing diagrams illustrating the principle of operation of the prior art circuit of FIG. 1.

The edge enhancement operation of the circuit of FIG. 4 is similar to that of the prior art circuit of FIG. 1. Thus, the circuit of the present invention produces signals similar to those shown in the time diagrams of FIGS. 2A–2G and in FIG. 3C. In other words, similar to the circuit of FIG. 1, the circuit of FIG. 4 takes a video input signal such as that shown in FIG. 2A, which includes an upward and then a downward transition in the video input, representing edges in the video image, and produces symmetrical overshoots around transitions in the pictures such as those illustrated in FIG. 2G. As described earlier, these symmetrical overshoots represent the enhancement of the edges in the video image, as was previously described with reference to FIGS. 3C.

One of the novel portions of FIG. 4 is generally represented by the fed forward gain control signal GC and the threshold control signal TC of the sharpness control amplifier 64. As described above, the prior art circuit of FIG. 1 only includes a sharpness control signal for its amplifier. The purpose of the fed forward gain control signal GC and threshold control signal TC is to reduce the background noise from the video input while maintaining a continuous input/output characteristic curve.

Figure 5:
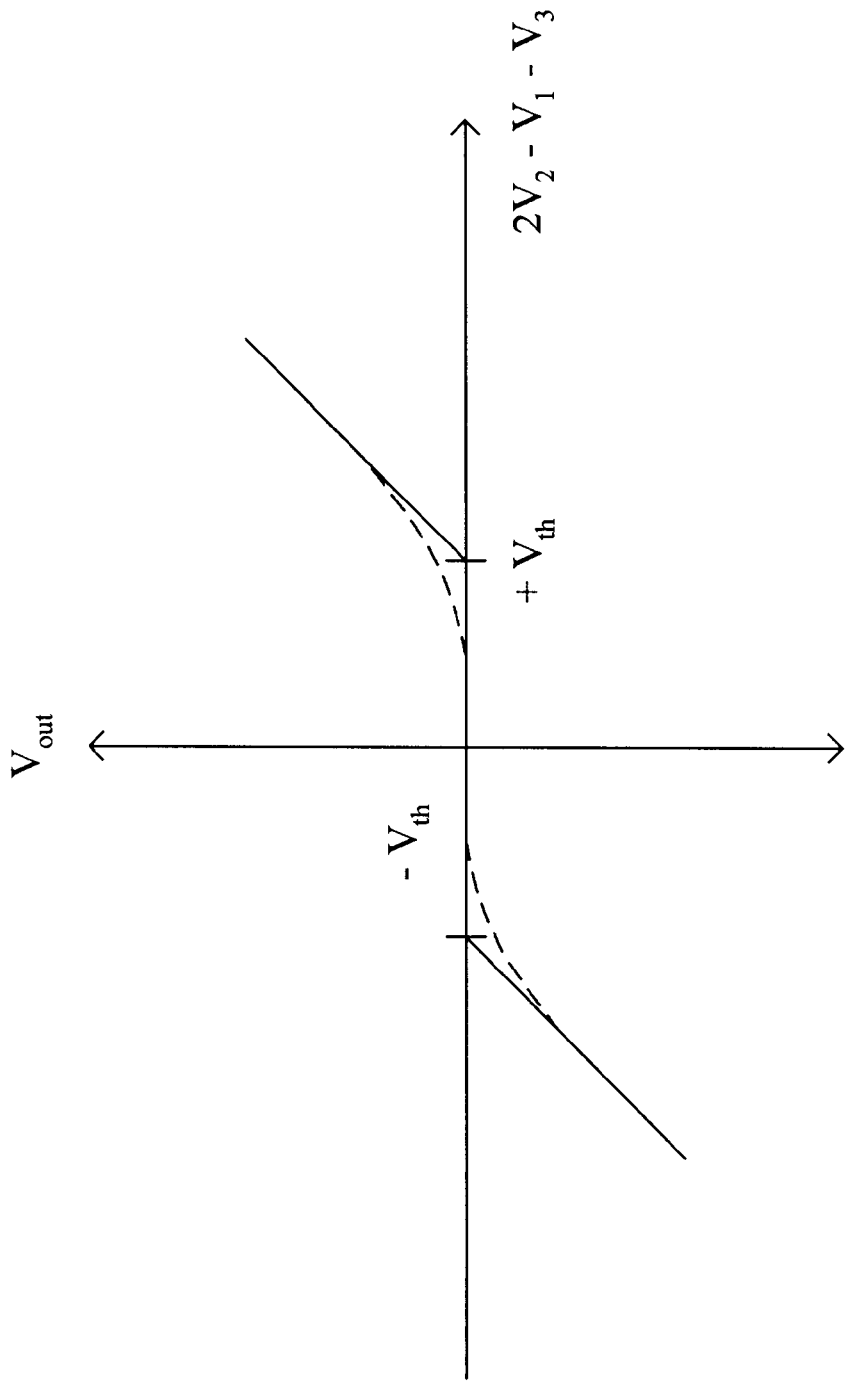
FIG. 5 illustrates the continuous input/output characteristic curve of the circuit of FIG. 4.

The way in which the circuit of FIG. 4 reduces background noise in the video input can be described with reference to FIG. 5. FIG. 5 illustrates the input/output characteristic curve for the circuit of FIG. 4. As illustrated in FIG. 5, the input/output characteristic curve is continuous over the range of input/output signals. FIG. 5 illustrates how the fed forward gain control signal GC and threshold control signal TC of sharpness control amplifier 64 suppress background noise from the video input signal by essentially removing lower amplitude transitions from the signal. An equation representing the solid-lined portion of the input/output characteristic curve shown in FIG. 5 is shown below. As will be described in more detail below, the following equation and FIG. 5 assume DELTA is equal to an output signal $V_{out}$ from sharpness control amplifier 64, minus a reference signal $V_{ref}$. The symbol $g_{64}$ represents the gain of sharpness control amplifier 64 of FIG. 4. As will be described in more detail below, the following equation is also based on certain simplifying assumptions.

$$DELTA = \begin{vmatrix} g_{64}[(2V_2 - V_1 - V_3) - V_{th}] & \text{if } 2V_2 - V_1 - V_3 > V_{th} \\ g_{64}[(2V_2 - V_1 - V_3) + V_{th}] & \text{if } 2V_2 - V_1 - V_3 < -V_{th} \\ 0 & \text{if } |2V_2 - V_1 - V_3| \leq V_{th} \end{vmatrix} \quad (1)$$

The problem with the solid-lined portion of FIG. 5 is that the coners are relatively sharp at the threshold $V_{th}$ levels. These sharp coners can cause flickering near the edge of the image signal from field to field due to noise. Thus, as will be described in more detail below, steps are taken in the present invention to smooth the coners. The smoother coners are shown as dotted lines in FIG. 5.

In general, the curve of FIG. 5 illustrates that the circuit of FIG. 4 produces a linear amplification for as long as the magnitude of the signal $(2V_2-V_1-V_3)$ is above a threshold value $V_{th}$. Once the magnitude of the signal $(2V_2-V_1-V_3)$ begins to drop below the threshold value $V_{th}$, the signal amplification begins to decrease, and as the signal $(2V_2-V_1-V_3)$ approaches zero, the output approaches zero. This characteristic curve illustrates that for image transitions of low amplitudes, there is a reduction in the signal. In this manner, background noise signals, which are typically of a low amplitude, are reduced. In contrast, larger amplitude signals, such as those produced by desired transitions in the video image, will have a magnitude above the threshold value $V_{th}$ and so receive the normal linear amplification. In this manner, the circuit of the present invention is able to produce image edge enhancement, while reducing background noise, and having a continuous input/output characteristic curve.

FIG. 6 illustrates an actual implementation of the sharpness control amplifier 64 of FIG. 4. As illustrated in FIG. 6, the sharpness control amplifier 64 includes three amplifiers 70a, 70b and 70c. As will be described in more detail below, the gain of each of the amplifiers is related to a gain factor. More specifically, the gain of amplifier 70a is related to a gain factor gmA, while the gain of amplifier 70b is related to a gain factor gmB, and the gain of amplifier 70c is related to a gain factor gmC.

As further shown in FIG. 6, the noninverting input of amplifier 70a receives the input of the sharpness control amplifier 64, designated as an input $V_{inp}$. The inverting input of the amplifier 70a, the noninverting input of the amplifier 70b, and the noninverting input of the amplifier 70c all receive a reference voltage $V_{ref}$. The output $(2V_2-V_1-V_3)$ from summer 58 in FIG. 4 is equal to $V_{inp}-V_{ref}$ and is fed forward as the gain control signal GC, which adjusts the gain of amplifier 70a as will be described in more detail below. Thus, as is the case for several of the signals shown in FIG. 4, the signal $(2V_2-V_1-V_3)$ actually represents a differential signal between a signal level and a reference level. The designations of certain of the signals in FIG. 4 also assume the reference level is equal to zero.

Returning to FIG. 6, the inverting input of amplifier 70b receives the input $V_{inp}$. The output of the amplifiers 70a, 70b, and 70c are all coupled together. Amplifiers 70a, 70b, and 70c output currents Ia, Ib and Ic, respectively. The output of amplifier 70c is coupled to the inverting input of the amplifier 70c, which is also designated as an output $V_{out}$ of the sharpness control amplifier 64. The signal DELTA of FIG. 4 is a differential signal equal to $V_{out}-V_{ref}$. Amplifier 70b receives a threshold control signal TC. The threshold control signal TC adjusts the gain of the amplifier 70b. Amplifier 70c receives a sharpness control signal SC. Sharpness control signal SC adjusts the gain of the amplifier 70c. The operating equation of the amplifier 64 as a whole can be described as follows. This equation includes the gain factors gmA, gmB, and gmC for the amplifiers 70a, 70b, and 70c, respectively, and is only accurate for a specific range of $V_{inp}-V_{ref}$.

$$V_{out}-V_{ref} = \frac{gmA}{gmC}(V_{inp}-V_{ref}) - \frac{gmB}{gmC}(V_{inp}-V_{ref}) \quad (2)$$

As described above, this equation is related to the signals DELTA and $(2V_2-V_1-V_3)$ by the following equations.

$$DELTA = V_{out}-V_{ref} \quad (3)$$

$$2V_2-V_1-V_3 = V_{inp}-V_{ref} \quad (4)$$

FIG. 7 shows an actual embodiment of one of the amplifiers 70 of FIG. 6. As illustrated in FIG. 6, amplifier 70 is a simplified linear transconductance amplifier and includes two PMOS transistors 72 and 74, two NMOS transistors 76 and 78, and a current source 80. The sources of PMOS transistors 72 and 74 are coupled to a supply voltage Vdd. The gates of PMOS transistors 72 and 74 are coupled together, and are coupled to the drain of PMOS transistor 72. The drains of PMOS transistors 72 and 74 are coupled to the drains of NMOS transistors 76 and 78, respectively. The gate of NMOS transistor 76 receives a positive input V+ while the gate of the NMOS transistor 78 receives a negative input V−. The sources of the NMOS transistors 76 and 78 are coupled to the current source 80.

Current source 80 is coupled between the sources of NMOS transistors 76 and 78, and ground. Current source 80 is controlled by a control signal XC and outputs a current $I_{80}$. When implemented as amplifiers 70a, 70b, and 70c in FIG. 5, the control signal XC of FIG. 7 is implemented as the gain control signal GC, the threshold control signal TC, or the sharpness control signal SC, respectively. The current output of the linear transconductance amplifier 70 of FIG. 7 is designated as $I_x$, while the voltage output is designated as output $V_{out}$. The amplifier 70 also has a gain factor gmX.

Figure 8:
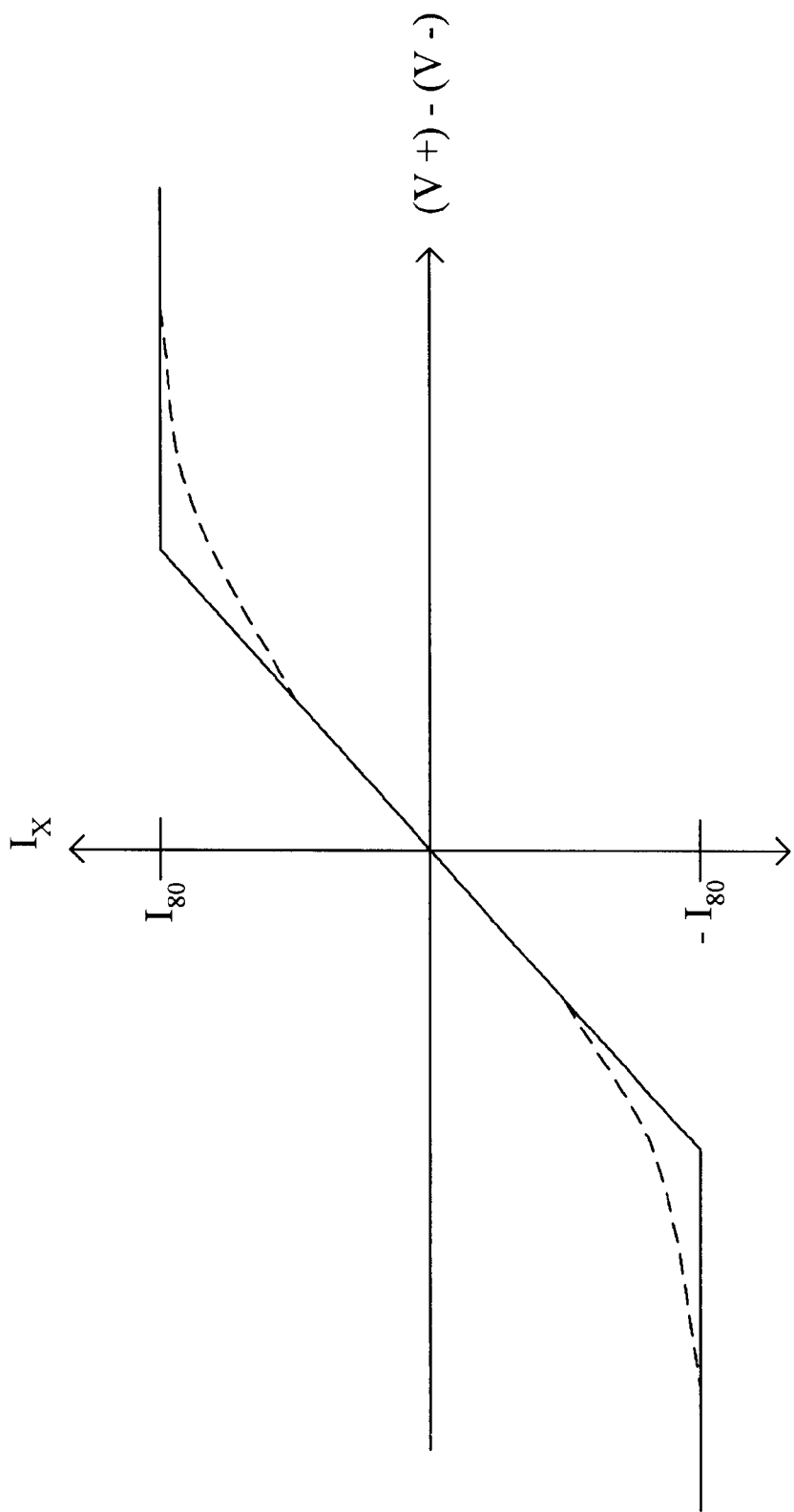
FIG. 8 illustrates an input/output characteristic curve for the transconductance amplifier of FIG. 7.

FIG. 8 illustrates the input/output characteristic curve for the linear transconductance amplifier 70 of FIG. 7. An equation representing the solid-lined portion of the input/output curve of FIG. 8 is written as follows. Also, as will be described in more detail below, the amplifiers of FIG. 7 will automatically have the smooth cornered function shown in the dotted-lined portion of FIG. 8, because the gain factor gmB will decrease when the current reaches its limit of Ia.

$$I_X = \begin{vmatrix} gmX(V+ - V-) & \text{if } |V+ - V-| \le \frac{I_{80}}{gmX} \\ +I_{80} & \text{if } V+ - V- > \frac{I_{80}}{gmX} \\ -I_{80} & \text{if } V+ - V- < -\frac{I_{80}}{gmX} \end{vmatrix} \quad (5)$$

Returning to the equations for FIGS. 5 and 6, if the current of amplifier 70b is made to be the same as that of amplifier 70a, then we have:

$$V_{th} = \frac{Ia}{gmB} \text{ and} \quad (6)$$

$$V_{out}-V_{ref} = \quad (7)$$

$$\begin{vmatrix} \frac{gmA}{gmC}(V_{inp}-V_{ref}) - \frac{gmB}{gmC}(V_{inp}-V_{ref}) & \text{if } |V_{inp}-V_{ref}| \le V_{th} \\ \frac{gmA}{gmC}(V_{inp}-V_{ref}) - \frac{Ia}{gmC} & \text{if } V_{inp}-V_{ref} > V_{th} \\ \frac{gmA}{gmC}(V_{inp}-V_{ref}) + \frac{Ia}{gmC} & \text{if } V_{inp}-V_{ref} < -V_{th} \end{vmatrix}$$

Furthermore, if the system is designed so that gmA is equal to gmB, then:

$$V_{out}-V_{ref} = \begin{vmatrix} 0 & \text{if } |V_{inp}-V_{ref}| \le V_{th} \\ \frac{gmA}{gmC}\left[(V_{inp}-V_{ref}) - \frac{Ia}{gmA}\right] & \text{if } (V_{inp}-V_{ref}) > V_{th} \\ \frac{gmA}{gmC}\left[(V_{inp}-V_{ref}) + \frac{Ia}{gmA}\right] & \text{if } (V_{inp}-V_{ref}) < -V_{th} \end{vmatrix} \quad (8)$$

And, if $gm_{64}$ is made equal to gmA/gmC, then the original simplified equation described above for FIG. 5 results.

While the preferred embodiment of the invention has been illustrated and described, it will be appreciated that various changes can be made therein without departing from the spirit and scope of the invention. The present invention has been described in relation to a preferred embodiment and several variations. One of ordinary skill after reading the foregoing specification will be able to effect various other changes, alterations, and substitutions of equivalents without departing from the broad concepts disclosed. It is therefore intended that the scope of the letters patent granted hereon be limited only by the definition contained in the appended claims and equivalents thereof, and not by limitations of the embodiments described thereof.

The embodiments of the invention in which an exclusive property or privilege is claimed are defined as follows:

1. In a video edge enhancement circuit comprising first and second delay lines coupled in series, the input signal to the edge enhancement circuit being delayed for a first time period by the first delay line to produce a first delayed signal, the first delayed signal being delayed for an additional time period by the second delay line to produce a second delayed signal, the edge enhancement circuit further comprising first and second amplifiers with inverting and noninverting inputs, the inverting input of the first amplifier receiving the input signal of the edge enhancement circuit, the noninverting inputs of the first and second amplifiers receiving the first delayed signal from the first delay line, and the inverting input of the second amplifier receiving the second delayed signal from the second delay line, the outputs of the first and second amplifiers being combined and amplified by a sharpness control amplifier, the output of the sharpness control amplifier being combined with the first delayed signal from the first delay line to produce a video output with edge enhancement of the transitions in the input signal, the improvement comprising:

providing a feed forward gain control loop to control the sharpness control amplifier and a threshold control for the sharpness control amplifier such that the sharpness control amplifier can be controlled to reduce background noise from the input signal by reducing low amplitude transitions from the input signal, wherein the threshold control of the sharpness control amplifier determines a threshold voltage, the threshold voltage determining when the video output will trend toward zero.

2. The improvement claimed in claim 1, wherein the edge enhancement circuit further comprises a summer coupled between the output of the first delay line and the output of the sharpness control amplifier.

3. The improvement claimed in claim 2, wherein the edge enhancement circuit further comprises a summer coupled between the outputs of the first and second amplifiers and the input to the sharpness control amplifier.

4. The improvement claimed in claim 1, wherein the combined output of the first and second amplifiers will trend toward zero if the magnitude of twice the first delayed signal minus the input signal minus the second delayed signal is less than the threshold voltage.

5. The improvement claimed in claim 4, wherein if the magnitude of twice the first delayed signal minus the input signal minus the second delayed signal is greater than the threshold voltage, then the combined output of the first and second amplifiers is equal to twice the first delayed signal minus the input signal minus the second delayed signal.

6. An edge enhancement circuit for processing image signals, comprising:

(a) a first delay line for delaying an input signal for a first time period to produce a first delayed signal;

(b) a second delay line for delaying said first delayed signal for an additional time period to produce a second delayed signal; and (c) processing circuitry for combining said input signal, said first delayed signal, and said second delayed signal to produce an output signal that includes edge enhancement of said input signal, said processing circuitry including a sharpness control amplifier with feed forward gain control and a threshold control for reducing background noise from said input signal, wherein the threshold control of the sharpness control amplifier determines a threshold voltage, the threshold voltage determining when the video output will trend toward zero.

7. The edge enhancement circuit of claim 6, wherein the edge enhancement circuit is fabricated on a CMOS imaging chip along with image sensor ciruitry.

8. The edge enhancement circuit of claim 6, further comprising first and second amplifiers, the inverting input of the first amplifier receiving the output of the second delay line and the inverting input of the second amplifier receiving the input signal, the sharpness control amplifier receiving the combined output of the first and second amplifiers.

9. The edge enhancement circuit of claim 8, further comprising a summer coupled between the output of the first delay line and the output of the sharpness control amplifier.

10. The edge enhancement circuit of claim 9, further comprising a summer coupled between the output of the first and second amplifiers.

11. The edge enhancement circuit of claim 6, wherein the combined output of the first and second amplifiers trends toward zero if the magnitude of twice the first delayed signal minus the input signal minus the second delayed signal is less than the threshold voltage.

12. The edge enhancement circuit of claim 11, wherein if the magnitude of twice the first delayed signal minus the input signal minus the second delayed signal is greater than the threshold voltage, then the combined output of the first and second amplifiers is equal to twice the first delayed signal minus the input signal minus the second delayed signal.

13. A CMOS edge enhancement circuit for processing video image signals, comprising:

(a) a first delay line for receiving and input signal and producing a first delayed signal;

(b) a second delay line for receiving the first delayed signal and producing a second delayed signal;

(c) a first amplifier with inverting and non inverting inputs, the inverting input receiving the second delayed signal and the noninverting input receiving the biased signal; (d) a second amplifier with inverting and non-inverting inputs, the inverting input receiving the input signal and the noninverting inputs, the inverting input receiving the input signal and the noninverting input receiving the biased signal;

(e) a summer for receiving the outputs of the first and second amplifiers and outputting a combined signal;

(f) a sharpness control amplifier with feed forward gain control and with a threshold control, the sharpness control amplifier receiving the combined signal and reducing noise from the input signal; and (g) a summer for receiving the first delayed signal and the output from the sharpness control amplifier to produce the video output of the edge enhancement circuit, wherein the threshold control of the sharpness control amplifier determines a threshold voltage, the threshold voltage determining when the video output will trend toward zero.

14. The edge enhancement circuit of claim 13, wherein the combined output of the first and second amplifiers trends toward zero if the magnitude of twice the first delayed signal minus the input signal minus the second delayed signal is less than or equal to the threshold voltage and wherein if the magnitude of twice the first delayed signal minus the input signal minus the second delayed signal is greater than the threshold voltage, then the combined output of the first and second amplifiers is equal to twice the first delayed signal minus the input signal minus the second delayed signal.

15. A method of enhancing edges in a video image signal, comprising the steps of:

(a) delaying an input signal for a first time period to produce a first delayed signal;

(b) delaying said first delayed signal for an additional time period to produce a second delayed signal; and (c) processing said input signal, first delayed signal, and second delayed signal to produce an output signal that includes enhancement of the edges in the input signal, said processing including a sharpness control amplifier with feed forward gain control and a threshold control that reduces lower amplitude transitions in the input signal, wherein the threshold control of the sharpness control amplifier determines a threshold voltage, the threshold voltage determining when the video output will trend toward zero.

* * * * *